United States Patent [19]

Graviss et al.

[11] Patent Number: 5,611,212

[45] Date of Patent: Mar. 18, 1997

[54] REFRIGERATOR DUAL AIR FLOW CONTROL MECHANISM

[75] Inventors: Kenton J. Graviss, Louisville; Jeffery D. Hunt, Shelbyville, both of Ky.

[73] Assignee: General Electric Company, Louisville, Ky.

[21] Appl. No.: 585,155

[22] Filed: Jan. 11, 1996

[51] Int. Cl.⁶ ..................................... F25D 17/06
[52] U.S. Cl. ............................ 62/187; 137/875; 236/49.5
[58] Field of Search ..................... 62/187, 408; 236/49.5; 454/304; 137/875, 625.44

[56] References Cited

U.S. PATENT DOCUMENTS

| | | | |
|---|---|---|---|
| 4,229,945 | 10/1980 | Griffin et al. | 62/187 |
| 4,699,314 | 10/1987 | Faurie | 236/49.5 |
| 4,704,874 | 11/1987 | Thompson et al. | 62/187 |
| 5,083,439 | 1/1992 | Orner et al. | 62/187 |
| 5,144,813 | 9/1992 | Orner et al. | 62/187 |
| 5,361,596 | 11/1994 | Martin | 62/187 |
| 5,385,032 | 1/1995 | Martin et al. | 62/187 |

*Primary Examiner*—William E. Tapoical
*Attorney, Agent, or Firm*—H. Neil Houser

[57] ABSTRACT

A control mechanism for simultaneously supplying air to a refrigerated compartment in two separate air streams includes a housing having an inlet communicating with first and second outlets. A first valve seat interconnects the inlet and first outlet and a second valve seat interconnects the inlet and second outlet. A unitary valve member rotatably mounted in the housing is movable between a closed condition engaging both of the valve seats to block air flow from the inlet to both of the outlets and an open condition out of engagement with both of the valve seats to permit air flow from the inlet to both of the outlets. A temperature responsive mechanism senses the temperature in the compartment and controls the condition of the valve member in response to the sensed temperature.

14 Claims, 2 Drawing Sheets

REFRIGERATOR DUAL AIR FLOW CONTROL MECHANISM

BACKGROUND OF THE INVENTION

The present invention relates to refrigerators and, more particularly, to such refrigerators with a dual air flow control mechanism. Many modern household refrigerators have separate freezer and fresh food compartments, with the freezer above the fresh food compartment. The evaporator normally is positioned in an evaporator chamber provided in the rear of the freezer and refrigerated air is supplied from the rear portion of the freezer, normally from the evaporator chamber, to the upper rear portion of the fresh food compartment. The freezer operates at a substantially colder temperature than the fresh food compartment and conveniently a first thermostat mechanism senses the temperature in the freezer and controls operation of the evaporator to maintain the desired freezer temperature range. A separate thermostat mechanism senses the temperature in the fresh food compartment and controls flow of refrigerated air from the freezer to the fresh food compartment to maintain the fresh food compartment in the desired temperature range. In many such refrigerators it is desirable to direct separate streams of refrigerated air horizontally through the upper portion and downwardly through the rear portion of the fresh food compartment as this improves the uniformity of cooling of the fresh food compartment. The provision of two separate streams of refrigerated air complicates the mechanism for controlling the air flow; which, in turn, tends to increase the cost of such refrigerators.

It therefore is an object of this invention to provide an improved refrigerator.

It is another object of this invention to provide a refrigerator with an improved control mechanism for providing two separate streams of air to a refrigerated compartment.

It is still another object of this invention to provide such an improved control mechanism in which a single valve member simultaneously controls the flow of refrigerated air to both of the outlets of the control mechanism.

SUMMARY OF THE INVENTION

In accordance with an illustrative embodiment of the present invention a refrigerator has a freezer compartment mounted above a fresh food compartment, with an evaporator positioned in the rear of the freezer compartment. A control mechanism for simultaneously supplying refrigerated air to the fresh food compartment in two separate streams includes a housing mounted in the upper rear portion of the fresh food compartment. The housing has an inlet conduit connected to receive refrigerated air from the evaporator; a first outlet conduit to direct air generally horizontally into the upper portion of the fresh food compartment and a second outlet to direct air generally downwardly into the rear portion of the fresh food compartment. The housing has a first valve seat connecting the inlet conduit and the first outlet conduit and a second valve seat connecting the inlet conduit and the second outlet conduit. A unitary valve member is pivotally mounted in the housing for movement between a closed condition engaging both the first and second valve seats, to block air flow from the inlet conduit to both of the first and second outlet conduits, and an open condition out of engagement with both of the valve seats to permit simultaneous flow of air from the inlet conduit to both of the outlet conduits. A temperature responsive mechanism is adapted to sense the temperature in the fresh food compartment and to control the condition of the valve member in response to the sensed temperature.

BRIEF DESCRIPTION OF THE DRAWINGS

The subject matter regarded as the invention is particularly pointed out and distinctly claimed in the concluding portion of the specification. The invention, however, both as to organization and method of operation, together with further objects and advantages thereof, may be better understood by reference to the following detailed description when read with the accompanying drawings in which:

DETAILED DESCRIPTION OF PREFERRED EMBODIMENT

Figure 1:
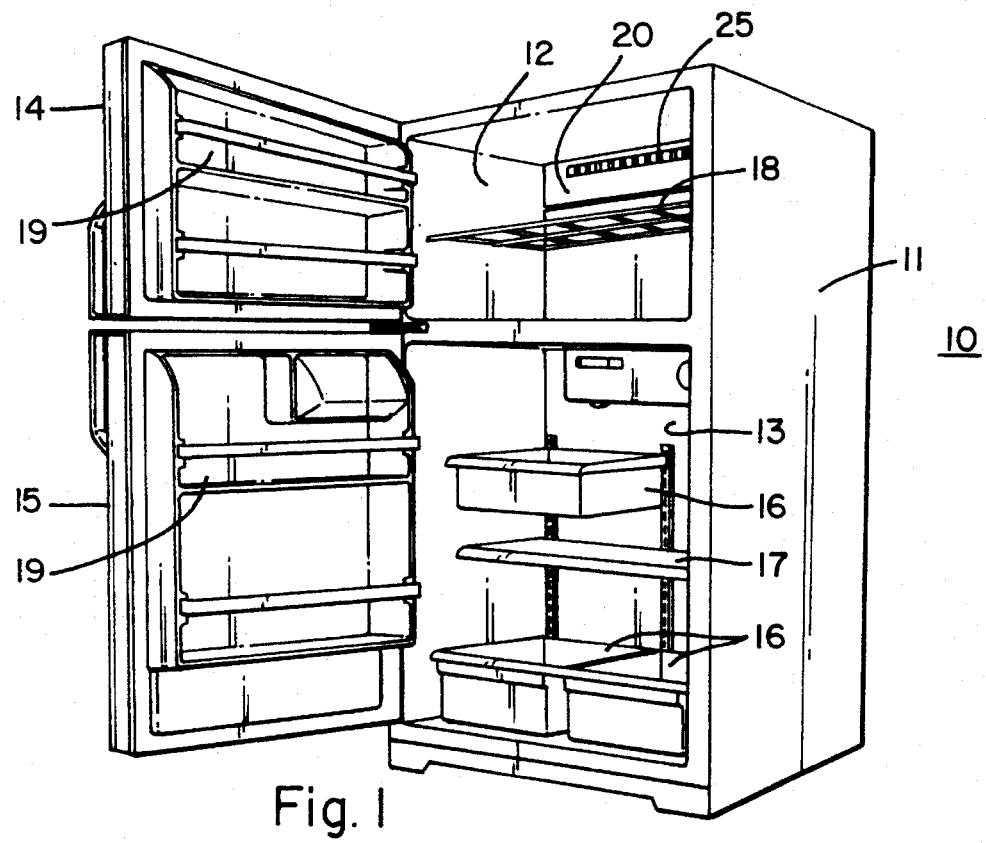
FIG. 1 is a simplified front perspective view of a refrigerator of the type with the freezer above the fresh food compartment, shown with the doors open.

Referring particularly to FIG. 1, there is shown a household refrigerator 10 of the top mount type. That is the cabinet 11 encloses a freezer compartment 12 mounted or positioned above a fresh food compartment 13. The compartments include front access openings which normally are closed by access doors 14, 15 respectively. Typically drawers 16 and shelves 17 are provided in the fresh food compartment to support various items to be refrigerated therein and the freezer may have a shelf 18 to enhance its storage capability. Conveniently the doors 14,15 are provided with shelves 19 to provide additional storage.

Figure 2:
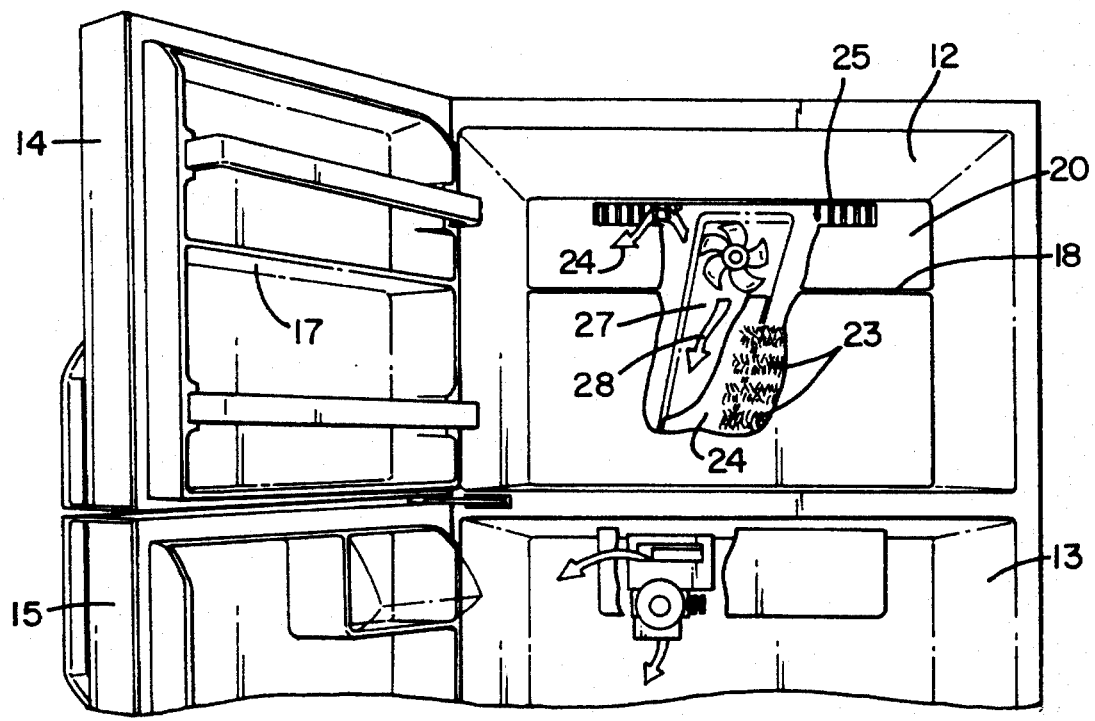
FIG. 2 is an enlarged front view of the freezer and upper portion of the fresh food compartment of the illustrative refrigerator, with some parts broken away to illustrate a portion of the refrigeration air flow system.
Figure 3:
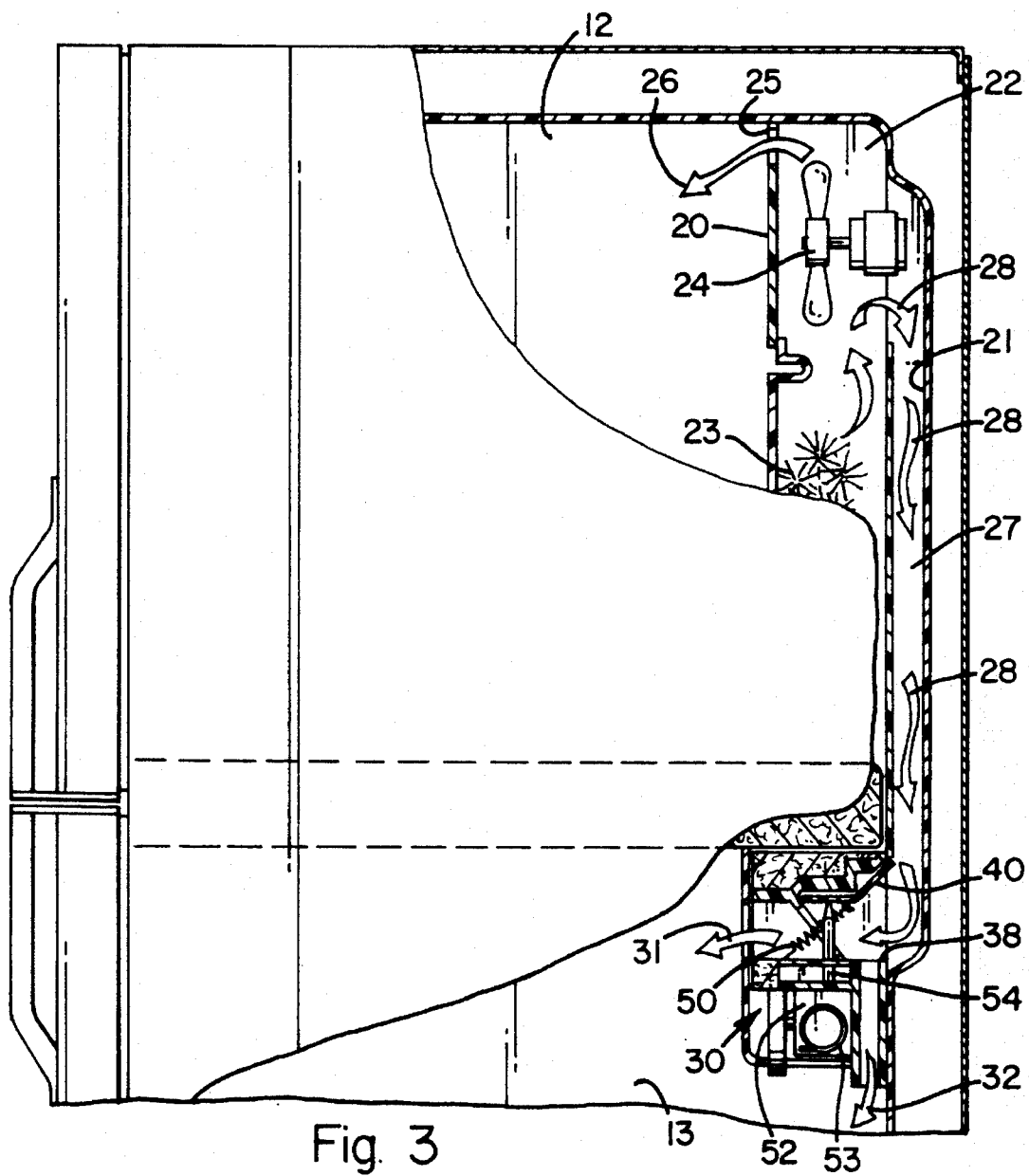
FIG. 3 is a side elevation view of the freezer and upper portion of the fresh food compartment of the illustrative refrigerator, with some parts broken away to illustrate a portion of the refrigeration air flow system.

Referring now to FIGS. 1–3, a vertical interior wall 20 extends across the freezer slightly in front of the freezer rear wall 21. This forms an evaporator chamber 22 in the rear portion of the freezer compartment 12. An evaporator 23 is mounted in the lower portion of the chamber 22 and a motor driven fan 24 is mounted in the chamber above the evaporator. The fan pulls relatively warm air into the lower portion of the evaporator chamber from the front portion of the freezer compartment and from the fresh food compartment and causes the air to flow upward over the evaporator to be refrigerated. The fan discharges part of the refrigerated air outward through an opening 25 into the freezer, as indicated by arrow 26. The fan also discharges a part of the refrigerated air downward through a duct 27 to the fresh food compartment 13, as indicated by arrows 28.

Figure 4:
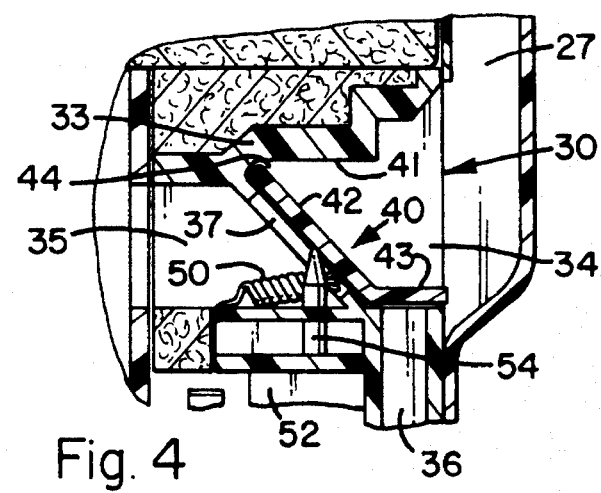
FIG. 4 is an enlarged cross section side elevation view of the dual air flow control mechanism of the illustrative refrigerator.

Referring now to FIGS. 3 and 4, the lower end of duct 27 is joined in air flow relationship with a dual air flow control mechanism 30 mounted in the upper rear portion of the fresh food compartment. As will be described in detail hereafter, when the fresh food compartment 13 needs cooling, the control mechanism 30 simultaneously directs part of the refrigerated air generally horizontally into the upper portion of compartment 13 (as indicated by arrow 31 in FIG. 3) and part of the refrigerated air generally downward into the rear portion of compartment 13 (as indicated by arrow 32 in FIG. 3). To this end control mechanism 30 includes a housing 33 which defines an inlet conduit 34 connected in air flow relationship with duct 27 to receive refrigerated air from the evaporator chamber portion of freezer compartment 12. The housing also defines a first outlet conduit 35 communicating with inlet conduit 34 and arranged to discharge or direct refrigerated air horizontally forward into the upper portion of fresh food compartment 13. In addition the housing 33 defines a second outlet conduit communicating with inlet conduit 34 and arranged to discharge or direct refrigerated air generally vertically downward into the rear portion of compartment 13. In the exemplification embodiment the inlet conduit is rectangular in cross section shape and extends horizontally; while the first outlet conduit 35 is rectangular in cross section and extends horizontally in alignment with the inlet conduit. The outlet conduit 35 is of smaller cross section size than the inlet conduit 34 so that a rim 37 extends around the junction between the inlet and outlet conduits. The rim 37 provides a first valve seat interconnecting the inlet conduit 34 and the outlet conduit 35, which is canted or angled away from a plane perpendicular to the axis of conduits 34,35. The second outlet conduit 36 also is rectangular in cross section and extends downwardly perpendicular to inlet conduit 34. Outlet conduit 36 is of smaller cross section than inlet conduit 34 so that the housing around the upper end of conduit 36 forms a rim 38 which is perpendicular to the axis of conduit 36 and is flush with the top of conduit 36. The rim 38 forms a second valve seat interconnecting the inlet conduit 34 and outlet conduit 36. In the illustrative embodiment outlet conduit 36 is of smaller cross section than outlet conduit 35 and is centered relative thereto along abutting edges. The rims 37,38 define an obtuse included angle.

Figure 5:
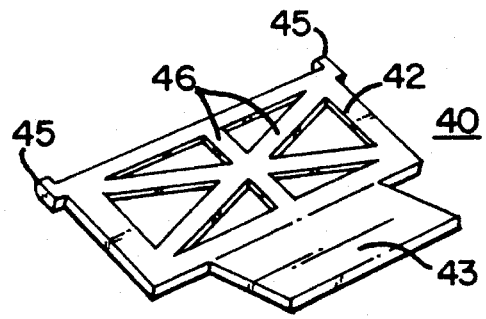
FIG. 5 is a perspective view of the valve member used in the dual air flow mechanism.

An unitary valve member 40 is rotatably mounted in housing 33 to simultaneously engage both valve seats 37,38 and prevent refrigerated air from flowing from inlet conduit 34 into either of outlet conduits 35 and 36 and to simultaneously move out of engagement with seats 37,38 and allow refrigerated air to simultaneously flow from inlet conduit 34 into both of outlet conduits 35 and 36. To this end the upper portion of rim 37 meets the top wall 41 of inlet conduit 34 to form an elongated recess 41 that pivotally supports the adjacent edge of valve member 40. Referring particularly to FIG. 5, valve member 40 has a first rectangular portion 42 sized to overlie and seal against valve seat 37 and a second rectangular portion 43 sized to overlie and seal against second valve seat 38. Conveniently the first and second valve member portions 42,43 are joined together along abutting edges and form an obtuse included angle corresponding to the angle formed by valve seats 37,38 so that the valve member will simultaneously engage both valve seats. A pair of projecting ears 45 are formed at opposite ends of the edge of first portion 42 remote from second portion 43. The ears are received in recess 44 for ease of pivotal movement of the valve member 40. Conveniently the valve member can be molded from a suitable plastic material, such as such as the polycarbonate material sold by General Electric Company under the name LEXAN, and reinforcing struts 46 can be molded in first portion 42 if desired.

A spring 50 is connected between the valve member 40 and housing 33. The spring 50 biases the valve member to its first or closed condition (as shown in FIG. 4) in which its first portion 42 engages first valve seat 37 and its second portion 43 engages second valve seat 38 to simultaneously prevent air from flowing from inlet conduit 34 to either of outlet conduits 35,36. A thermostat 52 is mounted on the outside of the housing 33 and is exposed to the air in the fresh food compartment 13. As is well known in the art the thermostat includes a capillary tube 53 that senses the temperature in the fresh food compartment and causes the refrigerant in the thermostat to exert a force on a bellows within the thermostat (not shown) that is responsive to the sensed temperature. As the capillary tube senses warmer temperatures the bellows causes a follower 54 to extend further from the thermostat. The follower engages the underside of valve member portion 42 and pivots the valve member 40 about recess 44 against the biasing force of spring 50 so that the valve member pivots out of engagement with the valve seats 37,38. At a predetermined high temperature in fresh food compartment 13 the follower 54 will have pivoted or rotated valve member to its full open position (as seen in FIG. 3). When the valve member is in its second condition, out of engagement with valve seats 37,38, refrigerated air can simultaneously flow from inlet conduit 34 to both of outlet conduits 35,36.

As the temperature in fresh food compartment 13 falls the bellows in thermostat 52 contracts and permits follower 54 to retract so that spring 50 moves valve member 40 toward valve seats 37,38. Thus the thermostat and spring are components of a temperature responsive mechanism that sets the valve member's position in response to the fresh food compartment temperature sensed by thermostat 52. The illustrative thermostat is of the modulating type in which the follower is incrementally moved in and out of the thermostat housing as the sensed temperature changes. It will be understood that the present invention also could incorporate a snap acting thermostat rather than a modulating thermostat. Both such types of thermostats are well known in the art and will not be described in detail for the sake of simplicity.

With a snap acting thermostat the closed condition of the valve member 40 is engaging valve seats 37,38, as seen in FIG. 4, and the open condition of valve member 40 is the fully open position, as seen in FIG. 3. With a modulating thermostat the closed condition of valve member 40 is engaging valve seats 37,38 and the open condition of valve member 42 is any position of valve member 42 out of engagement with the valve seats up the fully open position of FIG. 3, in which refrigerated air can simultaneously flow form the inlet conduit 34 to both outlet conduits 35,36. flow form.

While specific embodiments of the invention have been illustrated and described herein, it is realized that modifications and changes will occur to those skilled in the art to which the invention pertains. It is therefore to be understood that the appended claims are intended to cover all such modifications and changes as fall within the true spirit and scope of the invention.

What is claimed is:

1. A control mechanism for simultaneously supplying air to a refrigerated compartment in two separate air streams, comprising:

a housing having an air inlet, a first air outlet and a second air outlet;

a first valve seat interconnecting said inlet and said first outlet and a second valve seat interconnecting said inlet and said second outlet;

a unitary valve member pivotally mounted in said housing for movement between a closed condition engaging both said first and second valve seats to block air flow from said inlet to both said first and second outlets and an open condition out of engagement with both said first and second valve seats to permit air flow from said inlet to both said outlets; and temperature responsive mechanism adapted to sense the temperature in said compartment and to control the condition of said valve member in response to the sensed temperature.

2. A control mechanism as set forth in claim 1, wherein: said first outlet is aligned with said inlet and said second outlet is substantially perpendicular to said inlet.

3. A control mechanism as set forth in claim 2, wherein:

said second valve seat lies in a plane substantially perpendicular to said second outlet and said first valve seat is lies in a plane forming an obtuse angle with the plane of said second valve seat; and said valve member includes first and second portions adapted to close said first and second valve seats respectively when said valve member is in its closed condition.

4. A control mechanism as set forth in claim 3, wherein: said valve member is pivotally mounted adjacent an edge of said first valve seat remote from said second valve seat and said first and second valve member portions lie in planes forming an obtuse angle therebetween corresponding to the obtuse angle between the planes of said first and second valve seats.

5. A control mechanism as set forth in claim 1, wherein: said first valve seat has a rectangular cross section configuration of a first predetermined size and said second valve seat has a rectangular cross section of a second predetermined size smaller than that of said first valve seat.

6. A control mechanism as set forth in claim 5, wherein: said first outlet is aligned with said inlet and said second outlet is substantially perpendicular to said inlet;

said second valve seat lies in a plane substantially perpendicular to said second outlet and said first valve seat is lies in a plane forming an obtuse angle with the plane of said second valve seat; and said valve member includes a first portion of rectangular cross section shape adapted to close said first valve seat and a second portion of rectangular cross section shape adapted to close said second valve seat respectively when said valve member is in its closed condition.

7. A control mechanism as set forth in claim 6, wherein: said valve member is pivotally mounted along an edge of said first valve member portion remote from said second valve seat and said second valve member portion projects from an edge of said first valve member portion opposite said edge along which said valve member is pivotally mounted.

8. A control mechanism as set forth in claim 7, wherein: said second valve member portion is substantially centered along said edge of said first valve member portion from which it projects.

9. A control mechanism as set forth in claim 1, wherein: said temperature responsive mechanism includes a spring connected between said housing and said valve member and biasing said member to its closed condition and a thermostat adapted to sense the temperature in the compartment and including a plunger engaging said valve member and overcoming said spring to position said valve member in its open condition in response to a sensed temperature in a predetermined range of temperatures.

10. In a refrigerator having a freezer compartment mounted above a fresh food compartment and with an evaporator positioned in the freezer compartment, a control mechanism for simultaneously supplying refrigerated air to the fresh food compartment in two separate air streams, comprising:

a housing mounted in the upper rear portion of said fresh food compartment said housing having an inlet conduit connected to receive refrigerated air from said evaporator; a first outlet conduit to direct air generally horizontally into the upper portion of said fresh food compartment and a second outlet conduit to direct air generally downward into the rear portion of said fresh food compartment;

said housing further having a first valve seat interconnecting said inlet conduit and said first outlet conduit and a second valve seat interconnecting said inlet conduit and said second outlet conduit;

a unitary valve member pivotally mounted in said housing for movement between a closed condition engaging both said first and second valve seats to block air flow from said inlet conduit to both said first and second outlet conduits and an open condition out of engagement with both said first and second valve seats to permit air flow from said inlet conduit to both said outlet conduits; and temperature responsive mechanism adapted to sense the temperature in said fresh food compartment and to control the condition of said valve member in response to the sensed temperature.

11. A control mechanism as set forth in claim 10, wherein:

said first outlet conduit has a rectangular cross section configuration of a first predetermined size and said second outlet conduit has a rectangular cross section of a second predetermined size smaller than that of said first outlet conduit;

said second valve seat extends around the periphery of said second outlet conduit and lies in a plane substantially perpendicular to said second outlet;

said first valve seat extends around the periphery of said first outlet conduit and lies in a plane forming an obtuse angle with the plane of said second valve seat; and said valve member includes a first portion of rectangular cross section shape adapted to close said first valve seat and a second portion of rectangular cross section shape adapted to close said second valve seat respectively when said valve member is in its closed condition.

12. A control mechanism as set forth in claim 11, wherein: said valve member is pivotally mounted along an edge of said first valve member portion remote from said second valve seat and said second valve member portion projects from an edge of said first valve member portion opposite said edge along which said valve member is pivotally mounted.

13. A control mechanism as set forth in claim 12, wherein: said second valve member portion is substantially centered along said edge of said first valve member portion from which it projects.

14. A control mechanism as set forth in claim 10, wherein: said temperature responsive mechanism includes a spring connected between said housing and said valve member and biasing said member to its closed condition and a thermostat adapted to sense the temperature in the compartment and including a plunger engaging said valve member and overcoming said spring to position said valve member in its open condition in response to a sensed temperature in a predetermined range of temperatures.

\* \* \* \* \*